United States Patent
Croak et al.

(10) Patent No.: US 8,837,695 B1
(45) Date of Patent: Sep. 16, 2014

(54) METHOD AND APPARATUS FOR MONITORING SHIFTS IN CALL PATTERNS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1319 days.

(21) Appl. No.: 11/092,221

(22) Filed: Mar. 29, 2005

(51) Int. Cl.
*H04M 15/00* (2006.01)
*H04L 12/66* (2006.01)

(52) U.S. Cl.
USPC .......................... 379/133; 379/139; 370/352

(58) Field of Classification Search
CPC .............................. H04M 3/367; H04M 3/36
USPC ........................... 379/133, 137, 139; 370/352
See application file for complete search history.

(56) References Cited

U.S. PATENT DOCUMENTS

| | | | |
|---|---|---|---|
| 5,537,611 A * | 7/1996 | Rajagopal et al. | 379/134 |
| 5,907,602 A * | 5/1999 | Peel et al. | 379/134 |
| 6,650,619 B1 * | 11/2003 | Schuster et al. | 370/230 |
| 7,203,289 B2 * | 4/2007 | Jedlicka | 379/133 |
| 7,209,473 B1 * | 4/2007 | Mohaban et al. | 370/352 |
| 7,570,584 B1 * | 8/2009 | Daley | 370/229 |
| 2002/0022474 A1 * | 2/2002 | Blom et al. | 455/410 |
| 2003/0185200 A1 * | 10/2003 | Beyda | 370/352 |
| 2003/0185361 A1 * | 10/2003 | Edwards | 379/114.14 |

* cited by examiner

*Primary Examiner* — Nafiz E Hoque

(57) ABSTRACT

A method and apparatus for measuring pattern shifts in call patterns, e.g., call volumes and/or feature usage in a packet network, e.g., a VoIP network is disclosed. The present method collects performance data over a set period of time and constantly compares each periodic sample with the previous periodic sample on a rolling window basis. Changes of a pre-defined percentage threshold, e.g., approximately 30%, or more in a current sampled period are alarmed and monitored to preclude potential service disruptions. In one embodiment, upon receipt of these alarms, network elements that are vulnerable to discontinuities due to overload can be automatically reset or cleared of hung processes.

10 Claims, 5 Drawing Sheets

METHOD AND APPARATUS FOR MONITORING SHIFTS IN CALL PATTERNS

The present invention relates generally to communication networks and, more particularly, to a method and apparatus for monitoring shifts in call volume and feature usage load in packet networks, e.g. Voice over Internet Protocol (VoIP) networks.

BACKGROUND OF THE INVENTION

In a packet network, service disruptions can occur from sudden changes in call volume and service feature usage. Dramatic shifts in call volume or service feature usage load in a short period of time can put as much stress on network elements and software processes as excessive and prolonged call volume or service feature usage load. Abrupt changes in the pattern of feature usage can also produce aberrations in queues and software application threads that can lead to service disruptions.

Therefore, a need exists for a method and apparatus for monitoring shifts in call volume and/or service feature usage load in communication networks.

SUMMARY OF THE INVENTION

In one embodiment, the present invention discloses a method and apparatus for measuring pattern shifts in call patterns, e.g., call volumes and/or feature usage in a packet network, e.g., a VoIP network. The present invention collects performance data over a set period of time and constantly compares each periodic sample with the previous periodic sample on a rolling window basis. Changes of a pre-defined percentage threshold, e.g., approximately 30%, or more in a current sampled period are alarmed and monitored to preclude potential service disruptions. In one embodiment, upon receipt of these alarms, network elements that are vulnerable to discontinuities due to overload can be automatically reset or cleared of hung processes.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
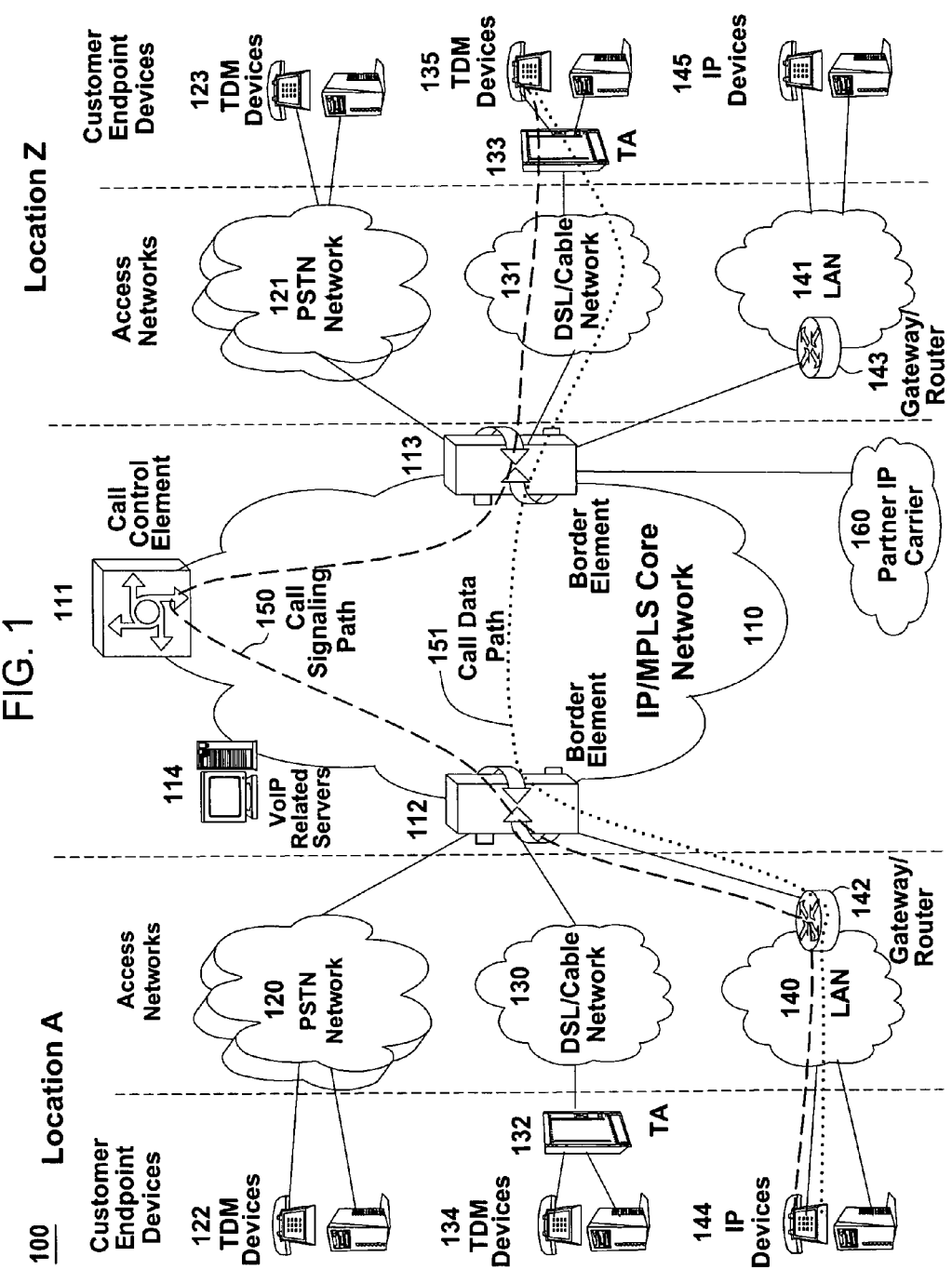
FIG. 1 illustrates an exemplary Voice over Internet Protocol (VoIP) network related to the present invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

In a communication network, service disruptions can occur from sudden changes in call volume and/or feature usage. Dramatic shifts in call volume or feature usage load in a short period of time can put as much stress on network elements and software processes as excessive and prolonged call volume or feature usage load. Abrupt changes in the pattern of feature usage can also produce aberrations in queues and software application threads that can lead to service disruptions.

To address this criticality, the present invention discloses a method and apparatus to measure pattern shifts in call volumes and/or feature usage in a packet network, e.g., a VoIP network. In one embodiment, the present invention collects real time performance data over a set period of time and constantly compares each periodic sample with the previous periodic sample on a rolling window basis. Changes of a pre-defined percentage threshold, e.g., approximately 30%, or more in a current sampled period are alarmed and monitored to preclude potential service disruptions. Upon receipt of these alarms, network elements that are vulnerable to discontinuities due to overload can be automatically reset or cleared of hung processes.

It should be noted that the present invention discloses a method and apparatus for measuring pattern shifts in call patterns in generally, where the call patterns may include call volumes, feature usage and so on. In one embodiment, the present invention measures call volume between time intervals. For example, if the present invention detects a significant shift in call volume (irrespective of the underlining feature usage), the present invention may implement a particular corrective action, e.g., resetting queues or clearing unnecessary or non-critical software processes in pertinent congested network elements.

In an alternate embodiment, the present invention measures feature usage between time intervals. For example, the measured pattern shifts in feature usage may assist the network provider to properly take corrective actions. For example, if a particular service feature is being requested by a large volume of callers or subscribers at the same time, e.g., a call forwarding service feature that allows users to forward calls directed toward their work number to be rerouted to a cellular number. It is possible that the feature usage rate for this feature may see a significant increase at the end of a work day (with or without a corresponding increase in the overall call volume). Thus, the present invention will monitor the feature usage and will be able to respond properly, e.g., activating and/or cause network elements to be made available to support the increase in usage of the pertinent service feature.

Alternatively, the call volume and the feature usage can be both measured at each time interval as well. This approach will allow the network provider a better understanding as to the potential cause of the impending overload condition.

Figure 2:
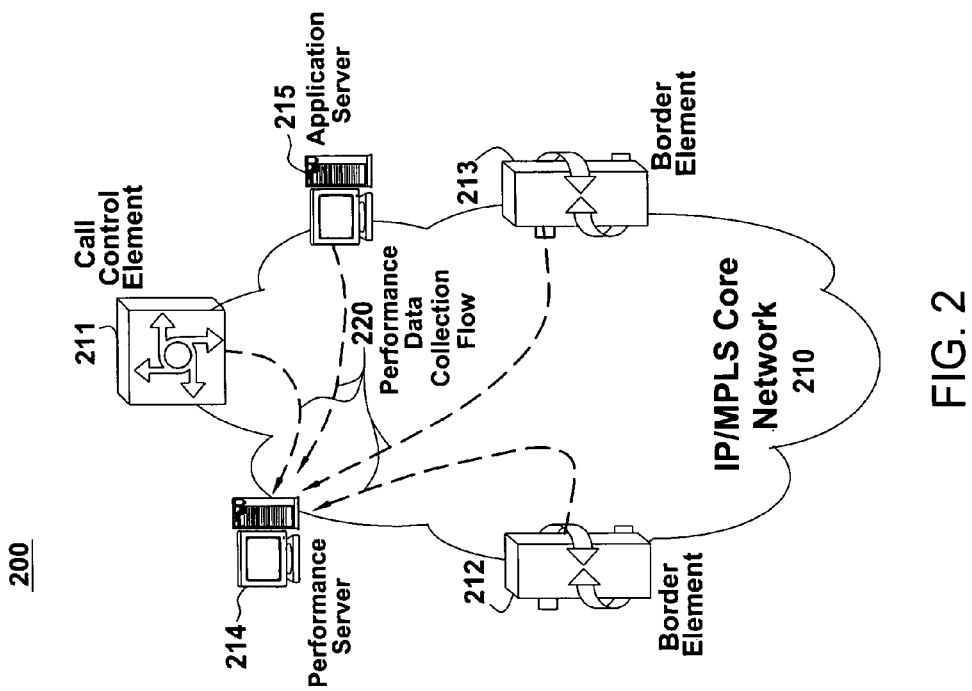
FIG. 2 illustrates an example of collecting call volume and feature usage load data from a VoIP network of the present invention.

FIG. 2 illustrates an example of collecting call volume and feature usage load data in a packet network 210, e.g., a VoIP network. In FIG. 2, performance data related to call volume and service feature usage load is collected from all network elements, such as CCE 211, BE 212, BE 213, and AS 215, within the network by Performance Server (PS) 214 as shown in performance data collection flow 220. It should be noted that the call volume and service feature usage load performance data is collected from network elements including, but is not limited to, CCEs, BEs, and ASs.

Figure 3:
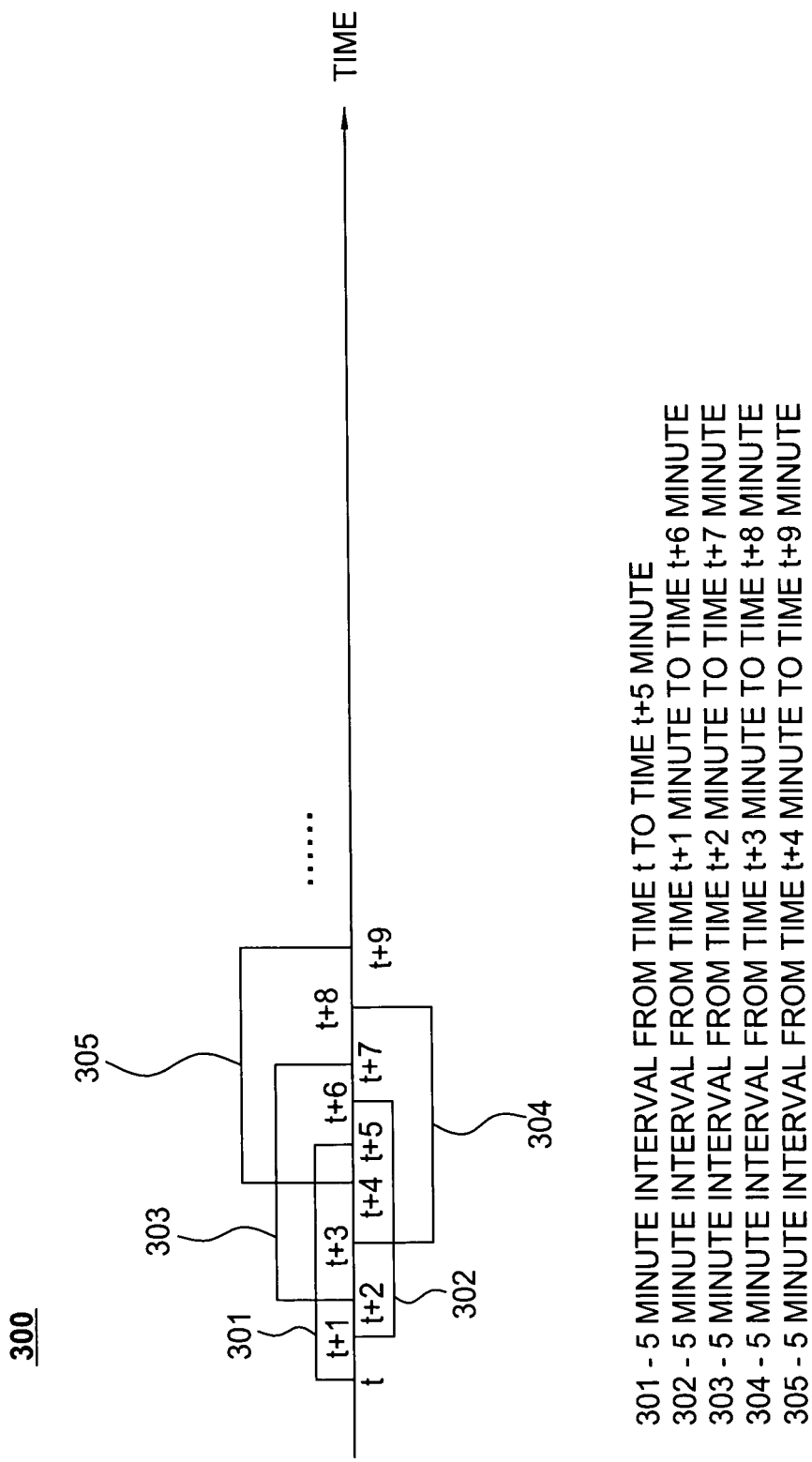
FIG. 3 illustrates an example of call volume and feature usage load measurement intervals used for monitoring shifts in call volume and feature usage load in a VoIP network of the present invention.

FIG. 3 illustrates an example of call volume and service feature usage load measurement intervals used for monitoring shifts in call volume and service feature usage load in a packet network, e.g., a VoIP network. The length of the call volume and feature usage load measurement interval is a configurable parameter that can be set by the network provider. For illustrative purposes, the load measurement interval used in FIG. 3 is set to be 5 minutes long. Load measurement interval 301 starts at time t and ends in time t+5 minutes; load measurement interval 302 starts at time t+1 minute and ends in time t+6 minutes; load measurement interval 303 starts at time t+2 minutes and ends in time t+7 minutes; load measurement interval 304 starts at time t+3 minutes and ends in time t+8 minutes; and load measurement interval 305 starts at time t+4 minutes and ends in time t+9 minutes and so on. These time intervals are overlapping. In one embodiment, within each load measurement interval, the call volume and the service feature usage are measured and logged. Each load measurement taken at the current load measurement interval is compared against the last load measurement interval to check if the percentage of increase in call volume or service feature usage loads exceeds a pre-specified threshold set by the network provider. For instance, the per-specified threshold percentage can be set as 30%, 40%, or 50% depending on the needs of the network provider. If the pre-specified threshold is exceeded, then an alarm will be raised by the PS to warn the network provider of potential or impending overload conditions within the network due to sudden shifts in call volume and/or service feature usage.

To illustrate, when load measurement of interval 302 has been taken, it will be compared to the load measurement taken in interval 301 to check if the pre-specified threshold is exceeded. When load measurement of interval 303 has been taken, it will be compared to the load measurement taken in interval 302 to check if the pre-specified threshold is exceeded. Similarly, load measurement take in interval 304 will be compared to that of 303, and load measurement take in interval 305 will be compared to that of 304 to check if the pre-specified threshold is exceeded and so on. The comparison will be performed on a rolling window basis by sliding the load measurement interval window out by 1 minute at a time to form the next load measurement interval window. In one embodiment, FIG. 3 illustrates the intervals to be overlapping.

However, in an alternate embodiment, the intervals can be non-overlapping, e.g., a first interval is from t+1 to t+6, a second interval is from t+6 to t+11, and so on. Non-overlapping intervals will reduce monitoring and computational cycles, but at the expense of detecting an overload situation at a slower rate.

Figure 4:
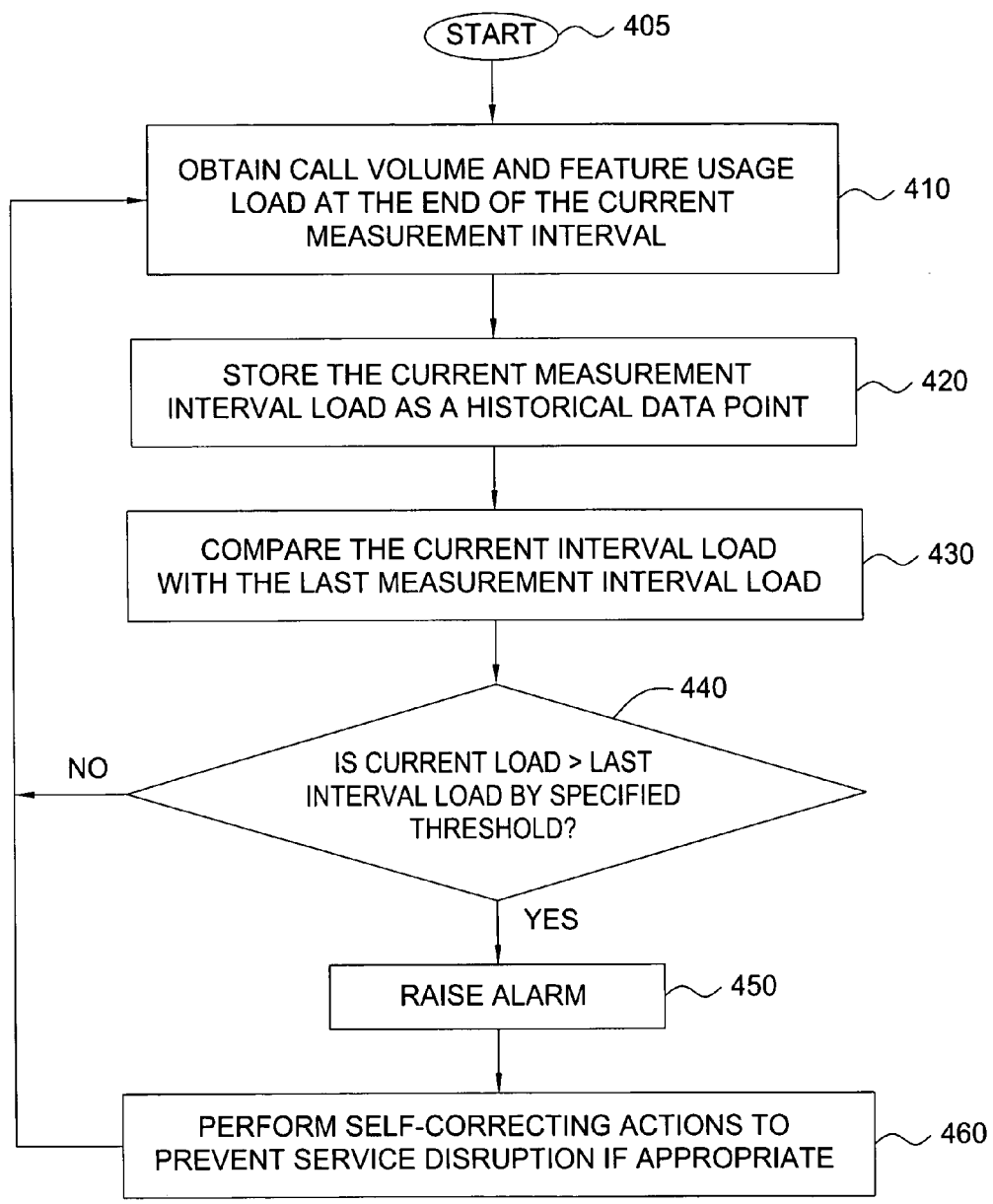
FIG. 4 illustrates a flowchart of a method for monitoring shifts in call volume and feature usage load in a VoIP network of the present invention.

FIG. 4 illustrates a flowchart of a method 400 for monitoring shifts in call volume and/or service feature usage load by the PS in a packet network, e.g., a VoIP network. Method 400 starts in step 405 and proceeds to step 410.

In step 410, the method obtains call volume and/or service feature usage load measurement at the end of the current load measurement interval (e.g., a current time interval). In step 420, the method 400 stores the current interval load measurement as a historical data point for future comparison purposes. In step 430, the method compares the current interval measured load with the last interval load measurement (e.g., a previous time interval). In step 440, the method checks if the current load measurement exceeds the last load measurement by a pre-specified percentage threshold (e.g., between 30%-50%) set by the network provider. If the pre-specified percentage threshold is exceeded, then the method proceeds to step 450; otherwise, the method 400 proceeds back to step 410. In step 450, the method raises an alarm to warn the network provider of a potential or impending overload conditions within the network. In step 460, if necessary, the method performs self-correcting actions to prevent service disruption by resetting call signaling message queues or clearing unnecessary software processes running in congested network elements and so on. The appropriate self-correcting actions can be performed by the method when processing load on particular network elements reach a capacity threshold pre-defined by the network provider. Then the method proceeds back to step 410.

Figure 5:
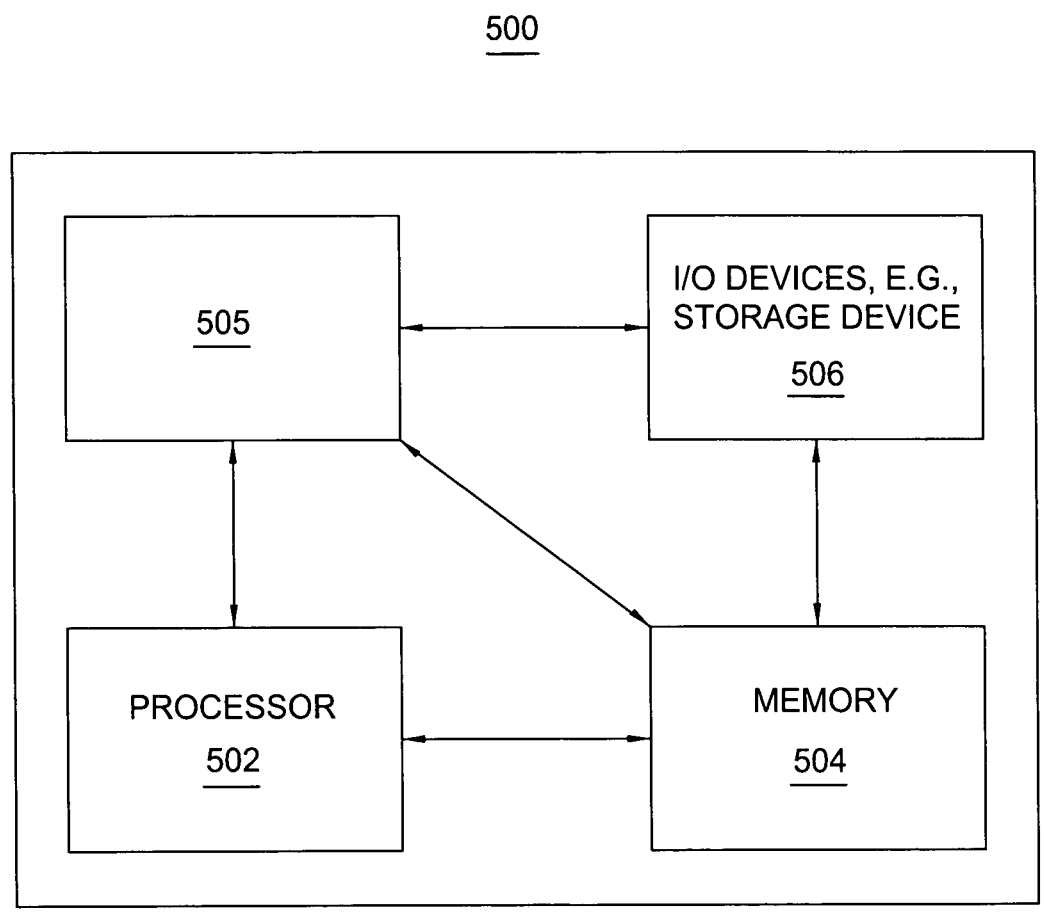
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a monitoring shifts in call volume and/or feature usage load module 505, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present monitoring shifts in call volume and/or feature usage load module or process 505 can be loaded into memory 504 and executed by processor 502 to implement the functions as discussed above. As such, the present monitoring shifts in call volume and feature usage load process 505 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for performing a self-correcting function in a communication network, comprising:

measuring, via a processor, a call pattern in the communication network in a current time interval, wherein each call pattern comprises a feature usage of a service feature and a call volume;

comparing, via the processor, the call pattern measured in the current time interval against a call pattern measured in a previous time interval to determine whether a pre-defined threshold of percentage of increase is exceeded, wherein the comparing is repeatedly performed in accordance with a rolling window by shifting the current time interval by a predefined time period with respect to the previous time interval, wherein the current time interval and the previous time interval are overlapping;

raising, via the processor, an alarm indication if the pre-defined threshold is exceeded; and performing, via the processor, the self-correcting function for preventing a service disruption of the service feature by re-setting a call signaling message queue by clearing a plurality of call signaling messages stored in the call signaling message queue when the pre-defined threshold is exceeded, wherein the service feature comprises a call forwarding service feature.

2. The method of claim 1, wherein the communication network is a voice over internet protocol network.

3. The method of claim 1, wherein a length of the current time interval and the previous time interval is selectively set by a network service provider.

4. The method of claim 1, wherein the pre-defined threshold of percentage is set to at least 30%.

5. A non-transitory computer-readable medium storing a plurality of instructions which, when executed by a processor, cause the processor to perform method operations for performing a self-correcting function in a communication network, the operations comprising:

measuring a call pattern in the communication network in a current time interval, wherein each call pattern comprises a feature usage of a service feature and a call volume;

comparing the call pattern measured in the current time interval against a call pattern measured in a previous time interval to determine whether a pre-defined threshold of percentage of increase is exceeded, wherein the comparing is repeatedly performed in accordance with a rolling window by shifting the current time interval by a predefined time period with respect to the previous time interval, wherein the current time interval and the previous time interval are overlapping;

raising an alarm indication if the pre-defined threshold is exceeded; and performing Ran the self-correcting function for preventing a service disruption of the service feature by re-setting a call signaling message queue by clearing a plurality of call signaling messages stored in the call signaling message queue when the pre-defined threshold is exceeded, wherein the service feature comprises a call forwarding service feature.

6. The non-transitory computer-readable medium of claim 5, wherein the communication network is a voice over internet protocol network.

7. The non-transitory computer-readable medium of claim 5, wherein a length of the current time interval and the previous time interval is selectively set by a network service provider.

8. The non-transitory computer-readable medium of claim 5, wherein the pre-defined threshold of percentage is set to at least 30%.

9. An apparatus for performing a self-correcting function in a communication network, comprising:
a processor; and
a computer readable medium storing a plurality of instructions that, when executed by the processor, cause the processor to perform operations, the operations comprising:

measuring a call pattern in the communication network in a current time interval, wherein each call pattern comprises a feature usage of a service feature and a call volume;

comparing the call pattern measured in the current time interval against a call pattern measured in a previous time interval to determine whether a pre-defined threshold of percentage of increase is exceeded, wherein the comparing is repeatedly performed in accordance with a rolling window by shifting the current time interval by a predefined time period with respect to the previous time interval, wherein the current time interval and the previous time interval are overlapping;

raising an alarm indication if the pre-defined threshold is exceeded; and performing the self-correcting function for preventing a service disruption of the service feature by re-setting a call signaling message queue by clearing a plurality of call signaling messages stored in the call signaling message queue when the pre-defined threshold is exceeded, wherein the service feature comprises a call forwarding service feature.

10. The apparatus of claim 9, wherein the communication network is a voice over internet protocol network.

* * * * *